July 27, 1926.　　　　　　　　　　　　　　　　1,593,882
G. A. ROBINSON
CONVEYER FOR DRIERS
Filed May 16, 1921　　　　　8 Sheets-Sheet 1

Inventor
George A Robinson
By Ellis Spear Jr.
Attorney

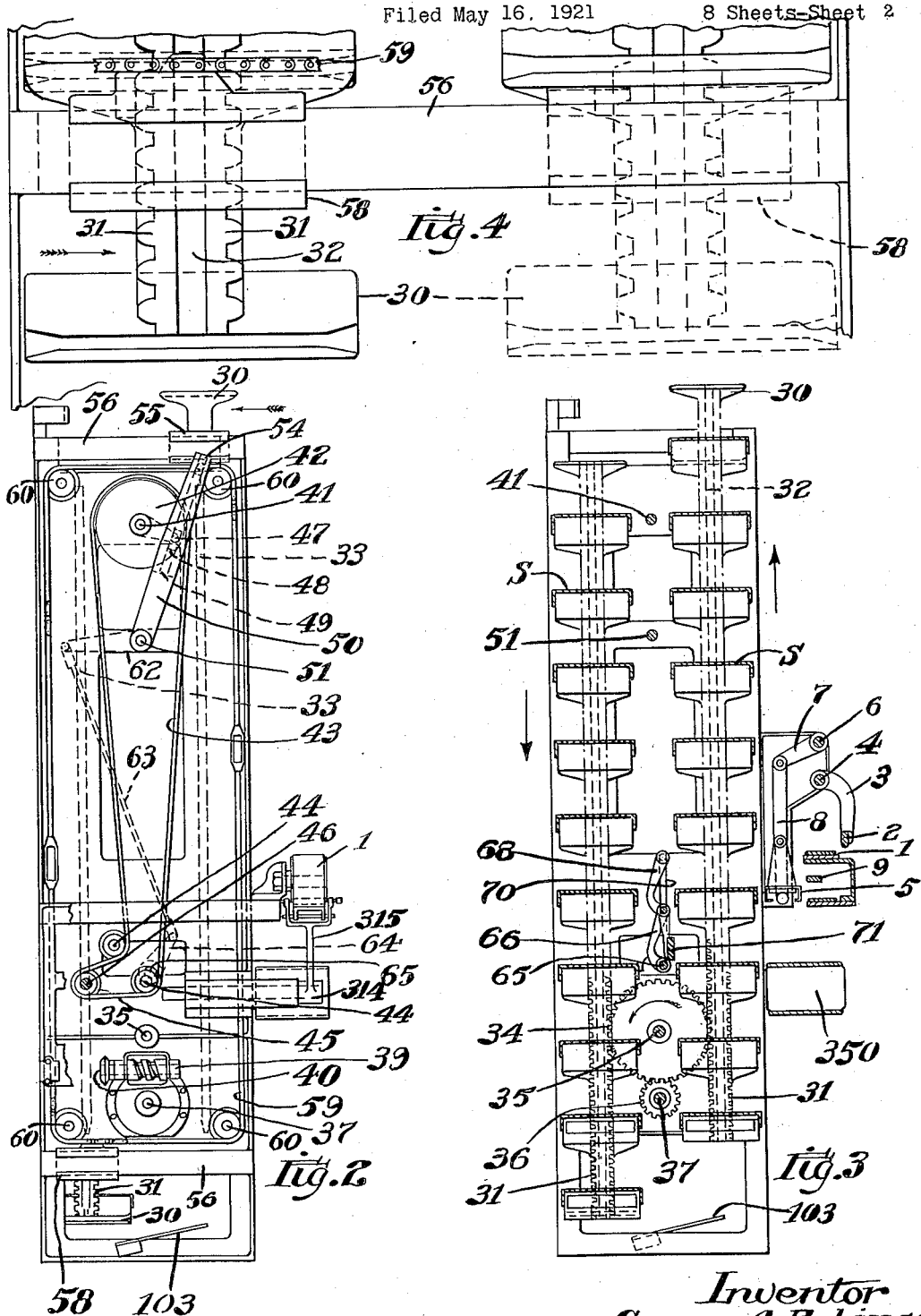

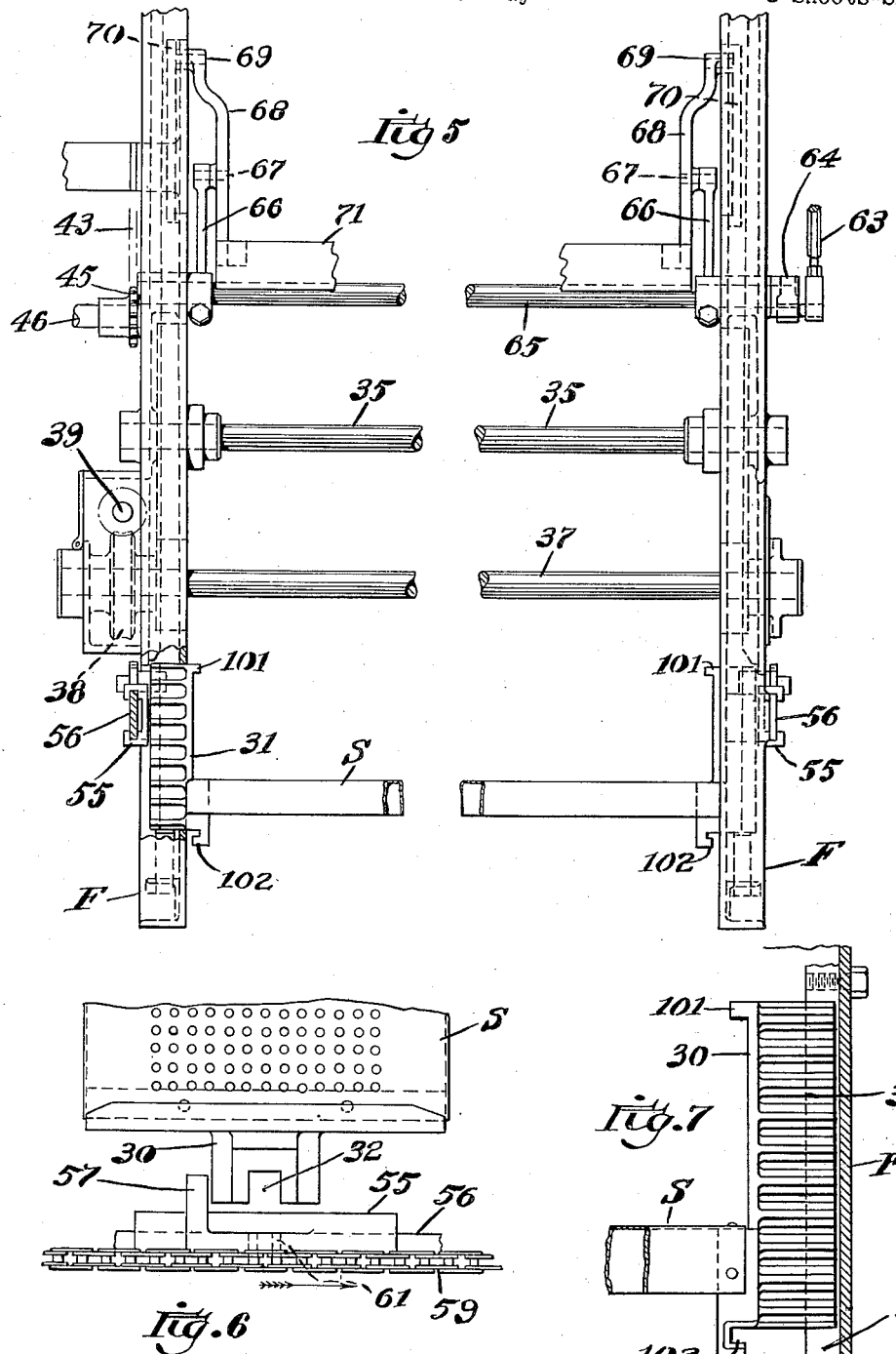

July 27, 1926.
G. A. ROBINSON
1,593,882
CONVEYER FOR DRIERS
Filed May 16, 1921
8 Sheets-Sheet 4
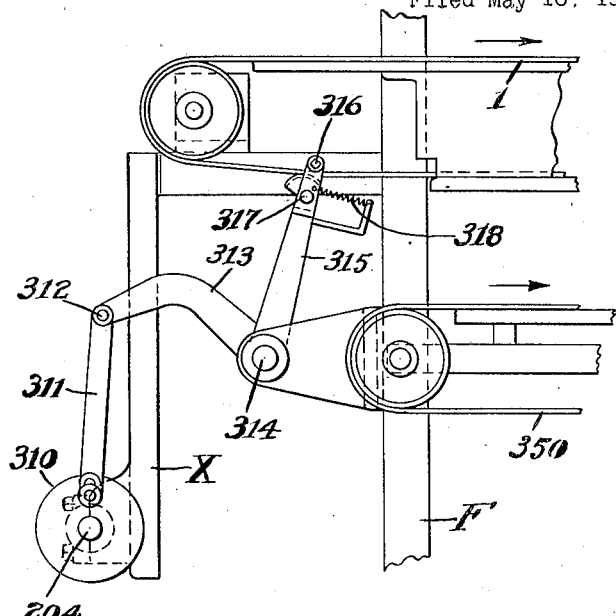
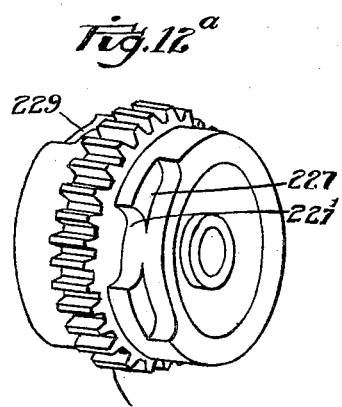
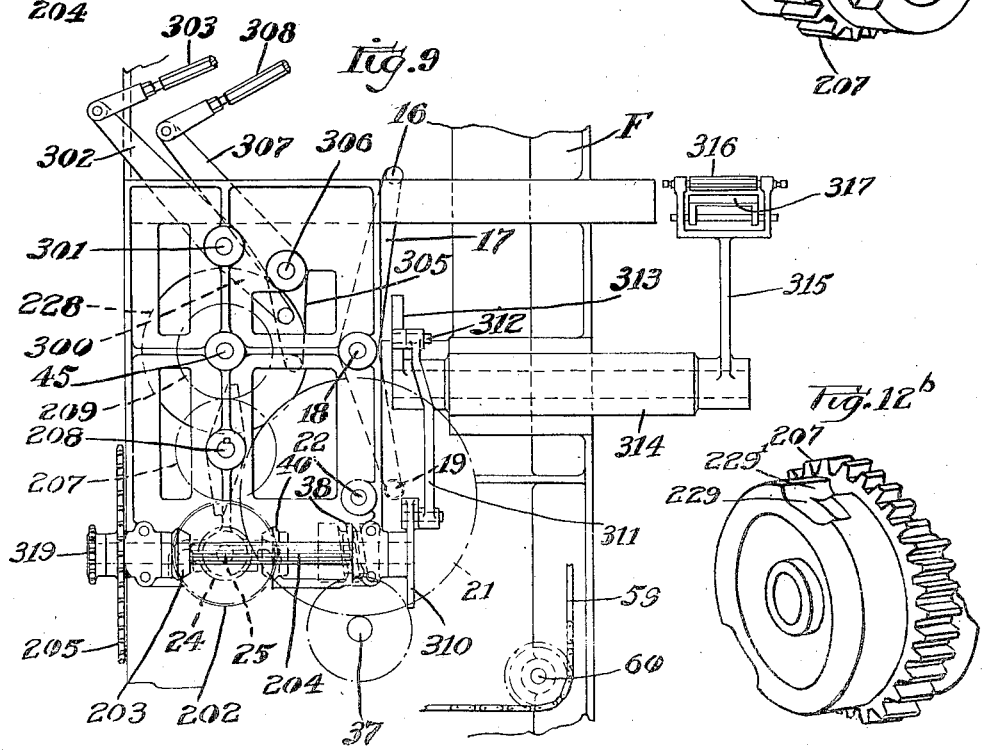
Inventor
George A. Robinson
By
Attorney

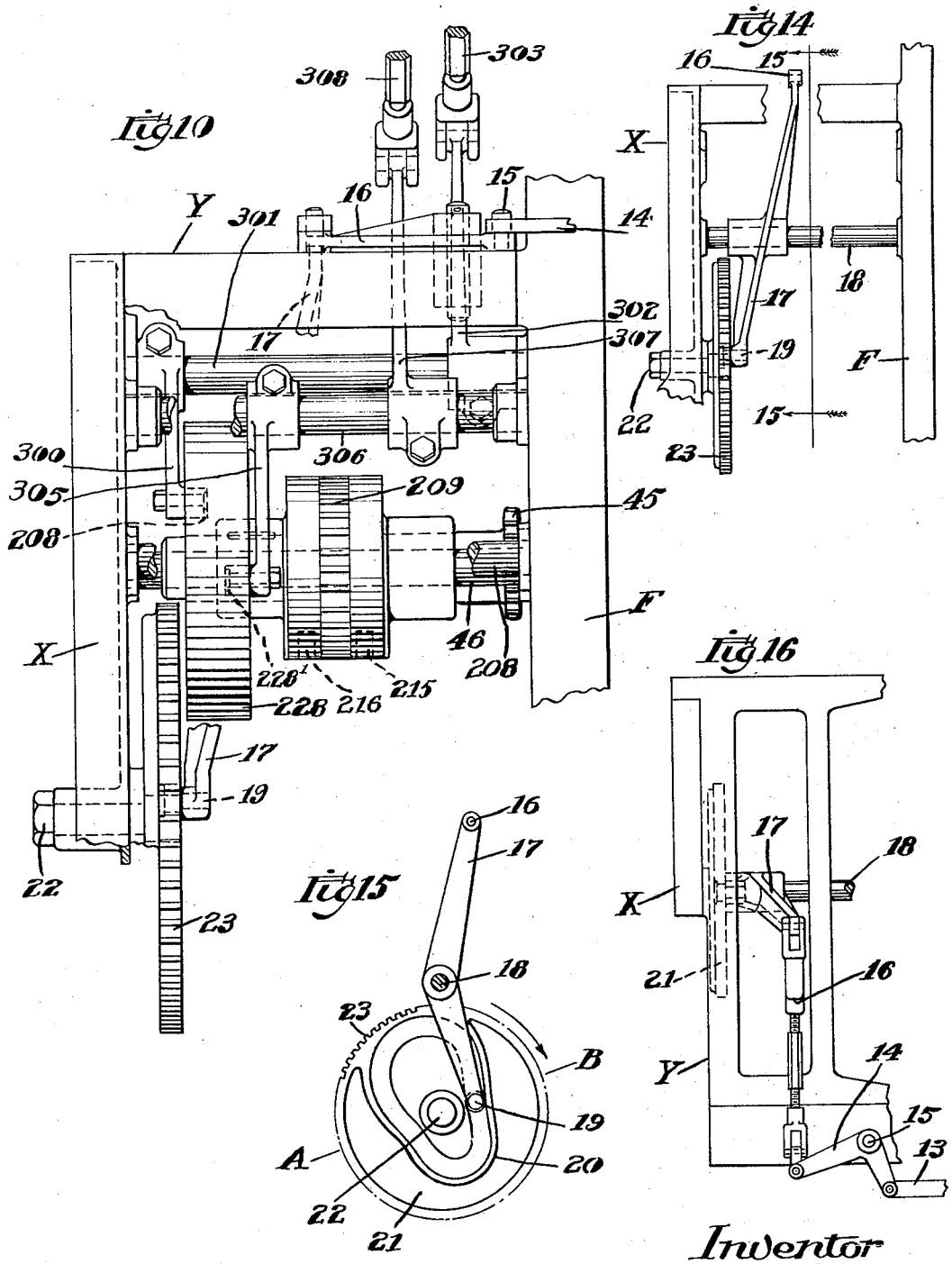

July 27, 1926.
G. A. ROBINSON
1,593,882
CONVEYER FOR DRIERS
Filed May 16, 1921    8 Sheets-Sheet 6
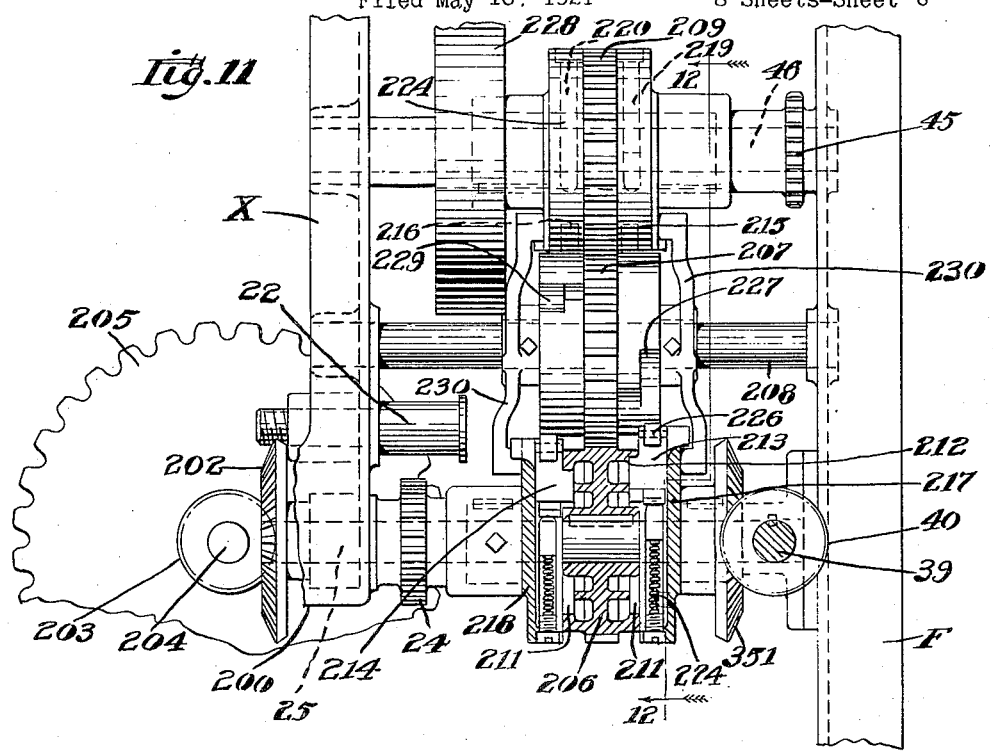
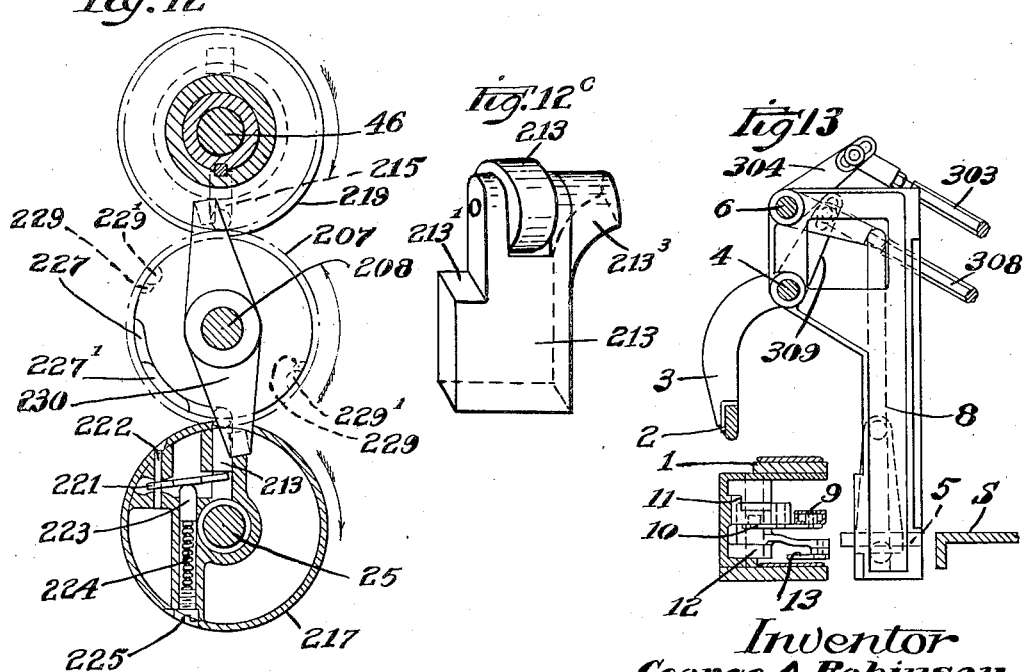
Inventor
George A. Robinson.
By Ellis Spoart
Attorney July 27, 1926.

G. A. ROBINSON 1,593,882

CONVEYER FOR DRIERS

Filed May 16 1921      8 Sheets-Sheet 7

Inventor
George A. Robinson
By Ellis Spruce
Attorney

July 27, 1926. 1,593,882
G. A. ROBINSON
CONVEYER FOR DRIERS
Filed May 16, 1921 8 Sheets-Sheet 8
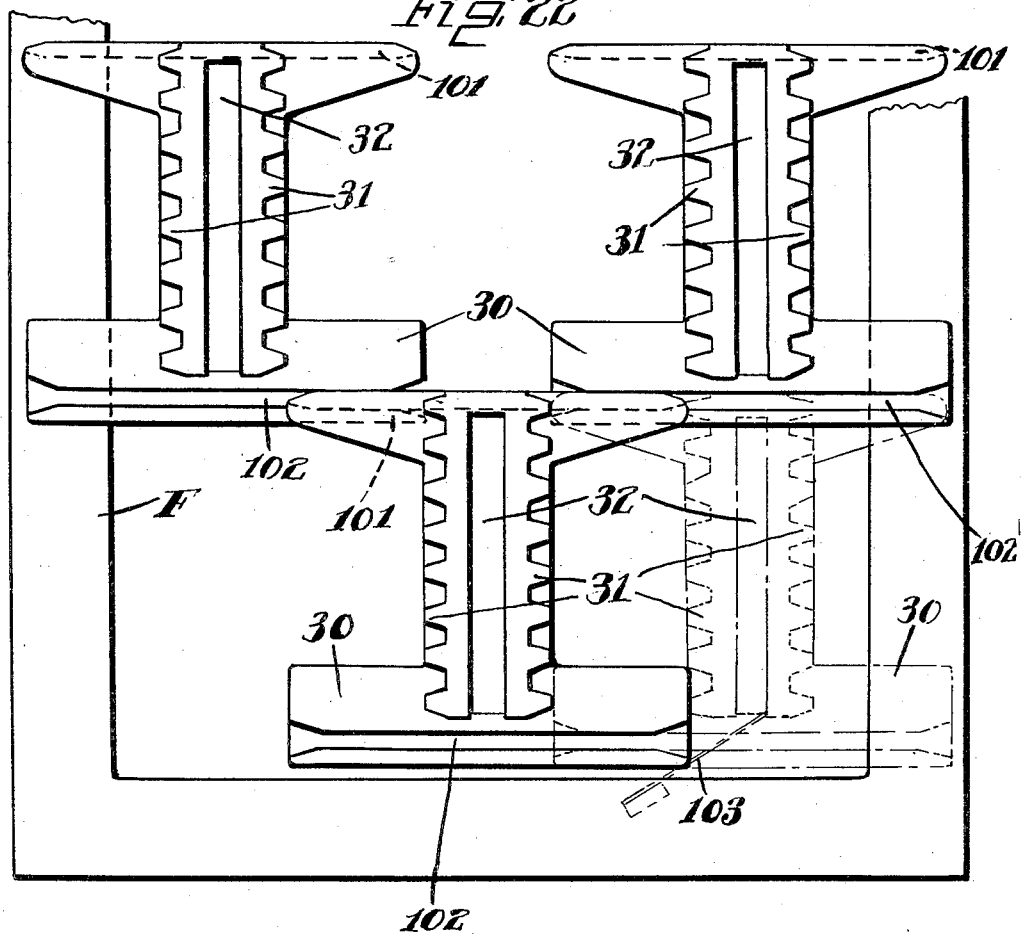
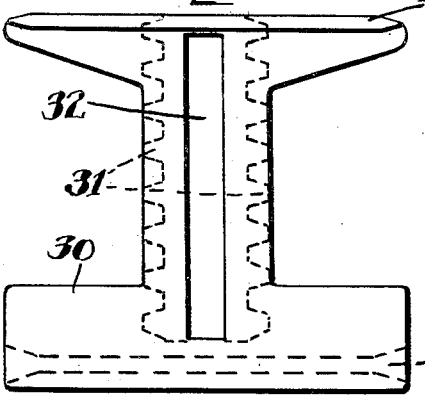
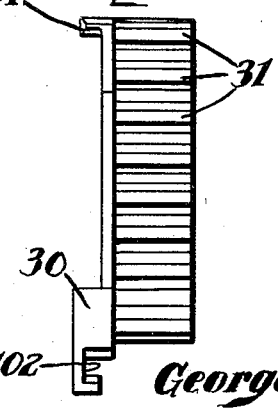
Inventor
George A. Robinson
By Ellis Spear Jr.
Attorney Patented July 27, 1926.

1,593,882

UNITED STATES PATENT OFFICE.

GEORGE A. ROBINSON, OF QUINCY, MASSACHUSETTS, ASSIGNOR, BY MESNE ASSIGN-
MENTS, TO STATE STREET TRUST COMPANY, TRUSTEE, A CORPORATION OF MASSA-
CHUSETTS.

CONVEYER FOR DRIERS.

Application filed May 16, 1921. Serial No. 469,861.

This invention relates to driers, and while capable of some variety of adaptation and use, may be considered primarily in connection with the drying of filled wet-labeled cans such as are used in the distribution of food or other domestic products. For the purposes of this application therefore, I shall discuss my invention in this particular adaptation, although it will be understood that such treatment is purely illustrative and in no way limiting.

As the filled cans discharge from the wet-labeling machine, each can is superficially damp, that is to say, each can is externally moist over substantially its entire surface, due to the moistened condition of the adhesively coated label or wrapper as applied by the wet-labeling machine. Unless this moisture is thoroughly dried out, the can will rust and the rust will come through the label. The rust spots detract from the appearance of the label, which is often highly artistic, and are therefore to be avoided. This may be accomplished most conveniently by drying the packages after they have been labeled or wrapped.

The problem of an efficient and commercially practical drier is complicated, however, by the packaging system of which the drier equipment is a supplementing part, and involves such factors as rate of delivery of the packages from the discharge end of the wet-labeling machine, rate of drying, available installation space for the drier, and general operating efficiency, as well as those considerations peculiar to the individual unit to be handled.

Without thereby limiting my invention strictly to such field, I shall discuss it hereinafter in relation to a filled wet-label package system, this being the form in which I have particularly developed my invention and in which it is of great and immediate value.

My drier equipment may be considered therefore as a supplemental part of a wrapping system in which a continuous and rapid supply of units are delivered in completely prepared commercial condition and in properly timed relation to the drier and are there rapidly and thoroughly dried so that continuous operation is maintained.

As illustrative of my invention I show and describe a drier which is a practical embodiment of the principles involved. Throughout the specification and drawings like reference characters are correspondingly employed, and in the drawings:—

Fig. 2 is an end elevation as viewed from the left of Fig. 1.

Fig. 3 is a vertical section on the line 3—3, Fig. 1.

Fig. 4 is a detail view of the transfer mechanism for setting over the shelves of the drier flight from one vertical column to the other, and indicating in dotted lines a shelf so set over.

Fig. 5 is a detail front elevation, particularly showing the mechanism for raising and lowering the shelves of the drier train.

Fig. 6 is a partial plan view of the drier shelf transfer mechanism and showing a shelf in position to be engaged by the shelf set-over slide.

Fig. 7 is a fragmentary elevation of a drier shelf bracket, particularly showing the tongue and groove interlocking connection for the bracket units.

Fig. 8 is a detail front elevation showing the drive for the package receiving and package delivery belts.

Fig. 9 is an end detail as viewed from the left of Fig. 1, showing the drive for the entire machine.

Fig. 10 is an elevation of the drive mechanism as viewed from the front of the machine in Fig. 1, portions of the machine being either omitted or broken away to clearly illustrate the structure in rear thereof.

Fig. 11 is a view similar to Fig. 10 and partly in section, showing additional details of the driving mechanism.

Fig. 12 is a section on the line 12—12 of Fig. 11.

Figs. 12$^a$ and 12$^b$ are perspective views from opposite sides of the timer gear shown in Figs. 11 and 12.

Fig. 12$^c$ is a detail view of one of the clutch dogs.

Figure 1:
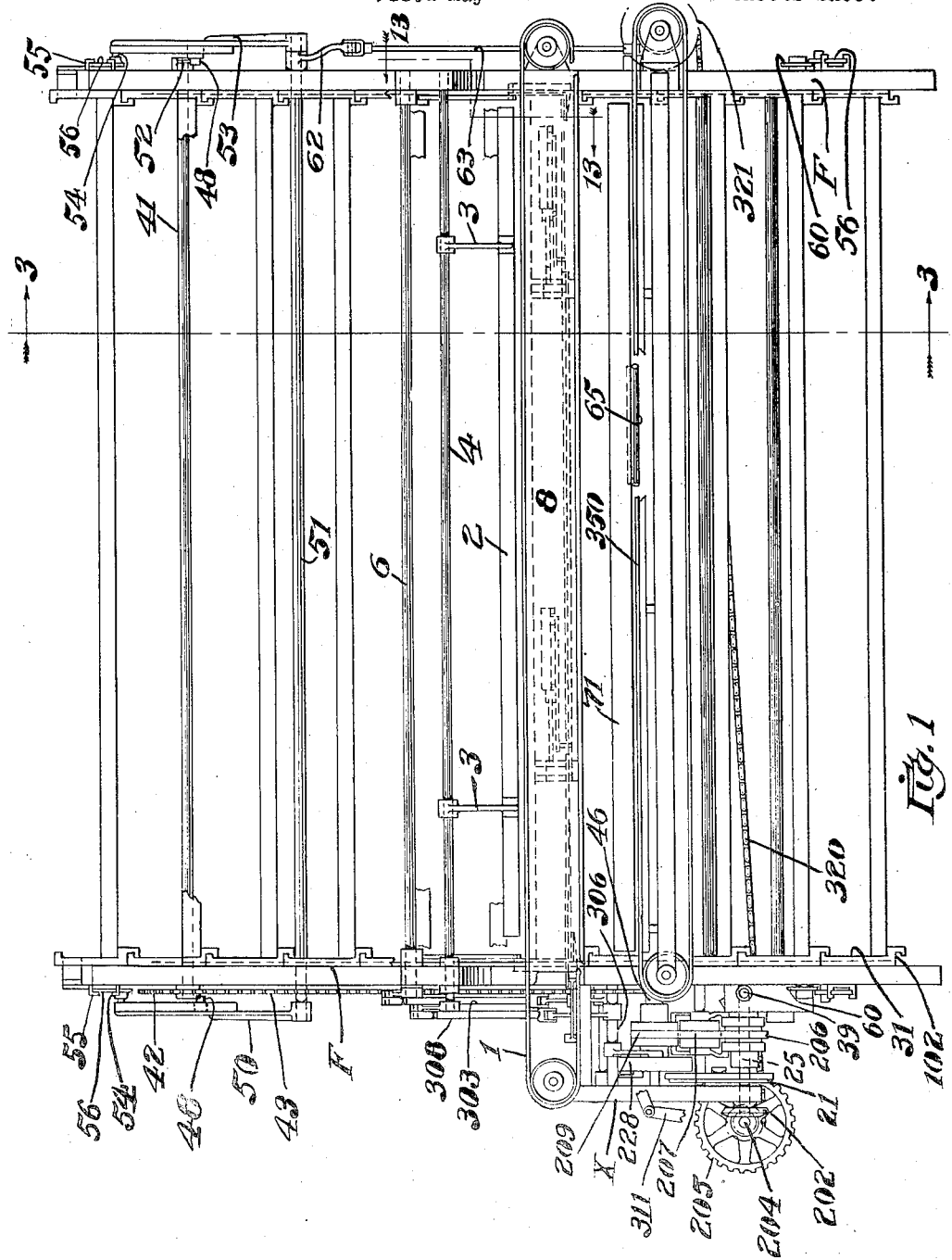
Fig. 1 is a front elevation of a drier in accordance with my invention, the drier casing being removed.

Fig. 13 is a vertical section on the line 13—13 of Fig. 1 and particularly showing the drier loader, the transfer pushers which operate relative thereto, and the mechanism for operating said parts.

Fig. 14 is a detail of the cam and cam lever for operating the loading pusher which operates between the drier loader and the drier shelves.

Fig. 15 is a section on the line 15—15 of Fig. 14.

Fig. 16 is a detail plan view particularly showing the operating connections from the cam and cam lever shown in Fig. 15 to the loading pusher detailed in Fig. 13.

Figure 17:
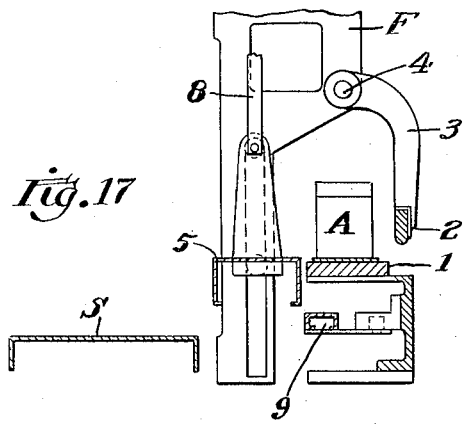

Figs. 17 to 21 inclusive are diagrams illustrative of the successive operation, Fig. 17 showing the start of the loading operation with the first row of cans on the receiving belt and the loading shelf in raised position.

Figure 18:
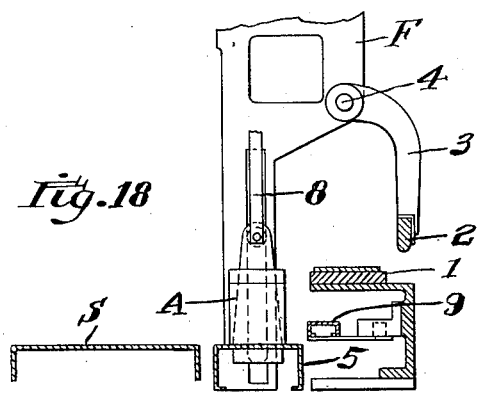

Fig. 18 shows the position of the parts after the first row of cans has been transferred to the loading shelf and the shelf has descended to its lowered position in which it is aligned with the drier shelf.

Figure 19:
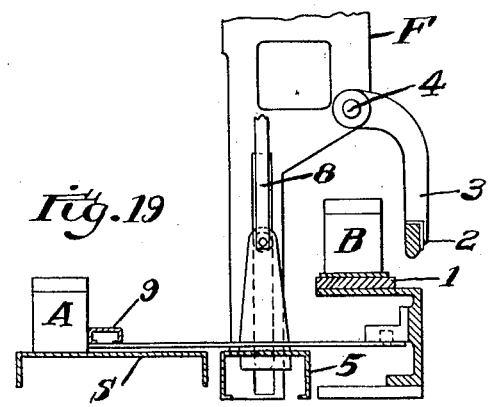

Fig. 19 shows the first row of cans set over laterally from the loading shelf onto the drier shelf and a second row of cans in position upon the receiving belt.

Figure 20:
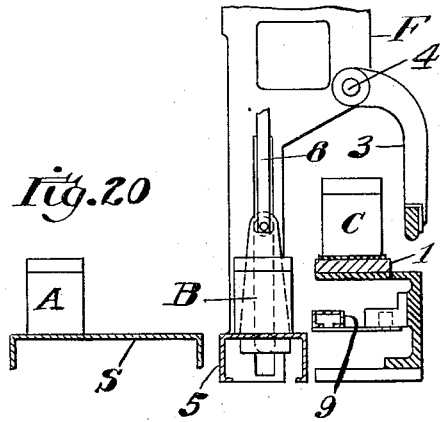
Figure 21:
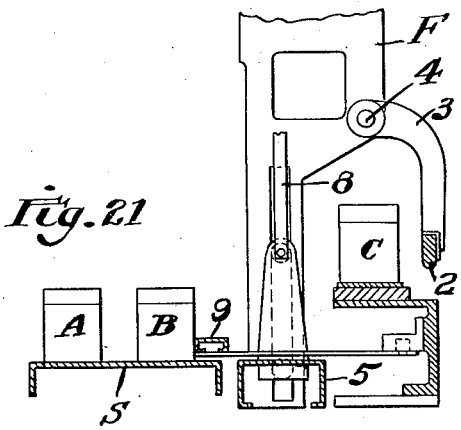

Fig. 20 shows the second row of cans transferred onto the loading shelf, which has raised to the position of Fig. 17 and returned to the position of Fig. 18, and a new row of cans on the receiving belt in position to be set over upon the loading shelf and from thence to the drier shelf next below the drier shelf being loaded, when said next below drier shelf has risen to the plane of the loading shelf, and Fig. 21 shows said second row of cans set over from the loading shelf to the drier shelf. Figure 22 is a fragmentary view, particularly illustrating the automatic transfer of the endmost shelf in one column to the other column, such shelf being shown in dotted lines in an intermediate position between the two columns and in such position, in a drier of the proportions shown in these drawings, said shelf slidingly interlocking with the lowermost shelf of the column to which it is moving before it passes out of engagement with the next lowermost shelf in the column from which it is moving, and Figures 23 and 24 are perspective views from opposite sides of one of the end pieces of a shelf unit detached from the shelf.

According to my invention the wet-labeled cans or other articles to be dried are placed either automatically as they are delivered from the wet-labeling machine or manually after they have been labeled, in groups of predetermined number and spacing according to the capacity of the drier and dimensions of the packages upon a package receiving conveyer which operates longitudinally past the drier chamber, and are automatically transferred from said conveyer to the drier. The packages remain within said chamber for a determined time interval and during such interval heated air is circulated through the chamber (by any suitable air circulating apparatus) to completely expel the moisture content of the package labels.

In order to utilize to the fullest degree the capacity of the drier chamber whereby the maximum number of packages may be dried therein, the drier chamber is provided with a plurality of interlocking connected drier shelves arranged for intermittent orbital travel within the drier chamber so that each shelf may be successively loaded as it reaches alinement with the package receiving conveyer and emptied as it reaches alinement with the package discharge conveyer which operates below the supply conveyer and at the same side of the drier chamber.

As here shown, the drier shelf gang or train consists of two vertical series of spaced superposed rigidly interlocked shelves which for convenience of terminology will be hereinafter referred to as the ascending and the descending series, combined with automatic mechanism for transferring each shelf in the ascending series over to the descending series as it reaches the top of the drier chamber and for transferring each shelf in the descending series over to the ascending series as it reaches the bottom of said chamber.

At each step or phase of its intermittent travel, that shelf in the ascending series of the drier shelf flight which has reached alinement with the package supply conveyer is automatically loaded by suitable shelf loading mechanism and the shelf immediately below said shelf which has just been loaded and which has now reached alinement with the dry package discharge conveyer is automatically unloaded by suitable shelf unloading mechanism.

By this arrangement, I avoid the disadvantages incidental to the use of an endless flight of drier shelves wherein the shelves are individually free to rock on their journals during their travel through the drier chamber and due to such swinging action, would tend to displace the packages loaded onto them.

According to my invention, the shelf units in each column of shelves are locked to the units next above and next below whereby each shelf column moves vertically within the drier casing as a continuous interlocked train.

The particular shelf-loading mechanism itself also possesses certain features of advantage which may well be set forth at this point.

According to my invention, the transfer of the packages to be dried from the package receiving belt to the drier shelves is effected in properly timed relation to the travel of the drier shelves by the cooperation of a pair of package transfer pushers with a loading member, hereinafter referred to as a loading shelf, operating vertically between the package receiving belt and the drier shelves.

In the machine described herein, the packages are placed upon the receiving belt a row at a time, whereupon the belt traversing pusher moves the first row of packages to the loading shelf which has been previously automatically raised to the level of the belt and is afterwards lowered to the level of the drier shelf to be loaded at which time the loading shelf traversing pusher transfers the packages from the loading shelf to the farther edge of the drier shelf. The loading shelf then returns to the level of the package supply belt and a second row of packages is loaded thereon by the belt pusher, whereupon the loading shelf again lowers to the level of the drier shelf and said second row of packages is transferred to the nearer edge of the drier shelf by the loading pusher, the drier shelf remaining in line with the path of operation of the loading pusher until both rows of packages are loaded on said shelf, and then commencing its travel through the drier chamber.

By this arrangement of intermediate loading shelf, I am able to slowly load each drier shelf, thus insuring certainty of package transfer, as distinguished from a rapid set-over of the packages from the belt directly onto the drier shelves, with the consequent danger of improper placement. By loading the packages on the drier shelf in double rows I not only utilize to the fullest extent the loading area of the drier shelves, but actually reduce the time of transfer per package unit from the supply belt to the drier shelf.

Each row of packages is successively ejected from the drier onto the package discharge belt by suitable ejecting mechanism operating in properly timed relation to the travel of the drier shelves.

Drier frame.

I have indicated at F, F a pair of spaced end uprights which are connected by a suitable casing-forming member whereby to constitute a closed drier chamber through which heated air or any other drying agent may be circulated by convenient apparatus to dry the packages placed upon the shelves within said chamber.

The wet-labeled cans to be dried are delivered from the wet-labeling machine onto a receiving belt 1 which extends longitudinally along the front of the machine outside of the drier casing. The cans are spaced apart on the belt a fixed distance from each other and as herein contemplated are successively placed upon said belt a row at a time, each row containing twenty-four cans.

The belt 1 is driven intermittently and its feed linearly at each driving impulse corresponds to the spacing of the cans. After the belt has moved twenty-four spaces as herein contemplated, this number being arbitrary and variable according to the size of the cans, the cans are in position to be set over onto the drier shelves. During such transfer, the belt pusher, loading shelf and loading pusher each operates twice to each operation of the drier shelf elevating and transfer mechanisms. Moreover since the packages are loaded upon the drier shelf in two rows, the throw of the loading pusher is longer at one operation than at its next operation.

Belt traversing pusher.

The rows of cans are successively transferred from the belt 1 to the drier shelf by a belt traversing pusher 2 which extends longitudinally along the front of the drier casing above the belt 1 and is hung from arms 3 mounted on a rock shaft 4. The pusher has sweeping or traversing movement across the belt towards the drier casing imparted to it by a double path cam 228. The cam path 228' in the right hand face of the cam 228, considering said cam as it appears in Fig. 10, engages a stud on an arm 305 which is fast on a shaft 306 journaled between one of the end frames F and a frame piece X. The shaft 306 is provided with an arm 307 which is connected by a connecting rod 308 with an arm 309 on the rock shaft 4 whereby to rock said shaft 4 and move the pusher bar 2 towards and from the drier shelf. As explained said pusher operates twice to each operation of the drier shelf elevating and transferring mechanisms.

Loading shelf.

Before the belt traversing pusher operates, a vertically movable loading shelf 5 operating between the belt 1 and the drier casing is raised to the level of the receiving belt to receive the packages as they are removed from said belt by the pusher 2. The loading shelf 5 is raised and lowered by a rock shaft 6 which is journaled in the same bearings which support the rock shaft 4 for the belt traversing pusher and is connected to said rock shaft 6 by arms 7 and connecting rods 8.

After receiving the first row of packages, the loading shelf 5 descends to the level of that shelf in the column of drier shelves which is to be loaded. The rising and falling movements of the loading shelf are effected by a cam path $228^2$ in the left hand side of the cam 228, considering said cam as it appears in Fig. 10. Working in this cam path is a stud on the end of an arm 300 which is fast on a shaft 301 journaled between the frame pieces X and F. Fast on the opposite end of said shaft 301 is a lever 302 which is connected by a connecting rod 303 to an arm 304 fast on one end of the rock shaft 6 whereby to rock said shaft 6 and raise and lower the loading shelf. As explained, said loading shelf operates twice to each operation of the drier shelf elevating and transferring mechanisms.

*Loading pusher.*

The row of cans thus moved onto the loading shelf 5 is then transferred from said shelf to the drier shelf by a loading pusher 9 which operates at right angles to the travel of the loading shelf 5. The loading pusher 9 is mounted at one end on links 10. (See Fig. 13). The other end of said links is provided with a roll which is guided in its movement in slotted brackets 11. The links 10 are carried approximately midway of their length on the ends of one arm of a pair of spaced bell crank levers 12 which are mounted in bearings supported in the frame which carries the entire pushing mechanism.

Each bell crank lever 12 is provided with an arm which extends at right angles to the first mentioned arm and the two arms are connected to one end of a connecting rod 13 which is attached at its other end to a bell crank 14 mounted on a stud 15 carried in a frame (see Fig. 16). The other end of the bell crank is attached to a connecting rod 16 which is connected to one end of a double arm cam lever 17. The lever 17 is mounted on a stud 18 and is provided at its other end with a roll 18 which operates in a cam groove 20 cut in a cam 21 loose on a stud 22. The rim of the cam is formed as a gear 23, and meshes with a pinion 24 loose on a secondary drive shaft 25 of the machine.

Inasmuch as the cans are placed upon the drier shelf from the loading shelf in double rows, the inner row of cans has to be moved inwardly a distance slightly greater than the outer row of cans.

To accomplish this the cam path 20 of cam 21 is generated as a double throw cam path. The long throw of the lever 17 is produced during the first half revolution of the cam 21. As shown in Fig. 15, the cam path 20 above the indicated line A—B is of sufficient length to give the required movement to the lever 17 to transfer the cans by means of the loading pusher to the back of the drier shelf. Upon the next revolution of the cam 21, the cam path below the line A—B will act on the stud 19 to produce a somewhat shorter movement of the lever 17 and a shorter travel of the loading pusher so that the second row of cans will be placed near the front of the drier shelf.

*Drier shelf elevating mechanism.*

Intermittently rotatable within the drier chamber is a gang or train of interlockingly connected drier shelves S, the bottoms of which are preferably perforated to facilitate the circulation of the heated air through the drier chamber.

The drier shelves are arranged in two vertical columns in spaced superposed relation and are mounted at each end in brackets 30. The brackets 30 are formed with vertical racks 31, each of which has a row of teeth on each longitudinal edge and a central guiding slot 32. The slots 32 fit over guide bars 33 fastened to the end frames F of the drier and are thereby guided in their up and down movement within the drier casing. The ends of the bars 33 are tapered to guide the shelves onto said bars at the next movement of the shelves vertically after they have been transferred successively from one column to the other by the drier shelf transfer mechanism described hereinafter.

The rack teeth of the brackets of each shelf mesh with a pair of gears 34 mounted at each end of the drier casing on a shaft 35 whereby the columns of shelves are raised and lowered. The shaft 35 is rotated by a pinion 36 on a driving shaft 37 which is provided at one end with a worm gear 38 meshing with a worm on a worm shaft 39. The worm shaft 39 is driven by a bevel gear 40 through the clutch mechanism detailed in Fig. 9 and described hereinafter.

*Drier shelf interlock.*

Each shelf bracket 30 is formed at its upper end with a tongue 101 and at its lower end with a groove 102 (see Fig. 7). Inasmuch as the racks are located in the machine one above the other, the tongue of one rack will engage and be held in the groove of the rack next above so that for the entire height of the superposed racks all racks will be interlocked together. The reason for this construction is that some of the racks and shelves are disposed below the gear 34 and would not otherwise be supported if it were not for the interlock at 101 and 102. This will be entirely clear upon inspection of Fig. 3.

During the transfer of the shelves from one column to the other, these tongues 101 through their engagement with the slots 102 serve to guide the shelf in its travel across the drier. The length of the brackets 30 corresponds accurately with the pitch of the rack teeth in order that the entire column of shelf brackets will form a continuous rack of the correct length and pitch since if the brackets are not of uniform length any variation will cause a difference in height of the two columns of shelves, thereby destroying the alinement of the tongue 101 of the topmost shelf bracket in one column with the slot 102 of the corresponding shelf bracket in the other column and thus interfering with the interlocking of the shelf brackets at the time that the shelf is transferred from one column to the other.

In the transfer of the shelves from one column to the other, the slots 32 of the shelf brackets are engaged with spring latches 103 at the bottom of the drier casing to prevent the shelf from being worked backward out of alignment with the column, due to any vibration within the drier casing. As the shelf is lifted up into the column, such lifting movement automatically withdraws the slot 32 from the spring latch 103.

*Drier shelf transfer mechanism.*

Extending longitudinally of the drier casing near the top thereof and between the columns of drier shelves is a sprocket shaft 41 having beyond one end of the casing a sprocket 42 thereon. The sprocket 42 is driven from a sprocket chain 43 (Fig. 2) which runs over idler sprockets 44 to a driving sprocket 45 on a clutch shaft 46 which is rotated intermittently in properly timed relation to the mechanism which raises and lowers the drier shelf columns.

The sprocket 42 is provided with a stud 47 on which is mounted a slide block 48 which travels in the lower end of a slideway 49 formed in an arm 50. The arm 50 is pivoted on a shaft 51 which is mounted between the end frames F of the machine below the shaft 41. On the opposite end of the shaft 41 is an arm 52 which is provided with a stud and slide block similar to that provided on the sprocket 42 and which shows directly in back of the stud 47 in Fig. 2. This last named block travels in the slideway of an arm 53 (see Fig. 1) mounted on the shaft 51.

Operating in the upper ends of the slideways 49 of the arms 50 and 53 are blocks and studs 54 mounted on slides 55 which are guided transversely across the upper ends of the drier casing on guides 56. Each slide 55 is provided with a lug 57 (Fig. 6) extending inwardly into the drier casing and adapted to engage with the brackets 30 of the drier shelves as said shelves are raised and lowered and thereby when the slide 55 is moved transversely across the drier by the operation of the arms 50 and 53 to carry the uppermost drier shelf from one column into position in line with the other column of shelves so that the shelf so transferred may be picked up by the shelf elevating racks 31 and fed vertically of the drier casing.

Similar transfer slides 58 are located at the bottom of the drier at each end thereof to transfer the lowermost shelf from one column of shelves into position in line with the other column of drier shelves. Each slide 58 is guided on guides 56 and is driven from a chain 59 which passes around idler sprockets 60 mounted on studs at the four corners of each end frame F of the drier.

During the transfer of the shelves from one column to the other, the shelf being transferred is maintained in a horizontal plane by reason of its beginning to mesh with the lowermost shelf of the column to which it is moving before it passes out of mesh with the shelf next above in the column from which it is moving. (See Figure 22.)

The chain 59 is rigidly attached to the slides 58 by pins 61 which pass through lugs on the slides 55 and through the links of the chain 59 (see Fig. 6). This causes the slides 58 to move across the drier frame at the same time and in opposite direction to the slides 55.

The operation of this portion of the machine is as follows: At a predetermined time in the cycle of operation of the drier, the sprocket 45 is rotated through the chain 43 and the sprocket 42 is caused to make a complete revolution, due to the engagement of the blocks 48 in the slideways 49 of the arms 50 and 53. The arms 50 and 53 will be rocked about their axis 51 and through the engagement of the blocks 54 in the upper ends of the same slideways 49 the slides 55 at the top of the machine will be moved transversely of the drier toward the left as indicated by the arrow in Fig. 2, and through the engagement of the lugs 57 with the brackets 30 will carry said bracket and its drier shelf across the drier chamber from the ascending column of shelves at the right (Fig. 2) into a position in alignment with the descending column of shelves at the left of the drier. Further rotation of the sprockets 52 will cause the arms 50 and 53 to move backward into original position as shown in Fig. 2 to repeat the operation when the next shelf rises into the uppermost position in the column of shelves.

At the same time that the uppermost shelf in the ascending column is set over into alinement with the descending column, the lowermost shelf in the descending column is automatically set over into alinement with the ascending column by the lower pair of slides 58 which through the engagement of the pins 61 on slides 55 with chain 59 are moved in opposite direction to the movement of the slides 55.

As each shelf is set over from one column into position in alinement with the other column, the tongues 101 at one end of its brackets 30 engage with the grooves 102 at the adjacent end of the shelf brackets next above or below according to whether the column is ascending or descending, and is thereby interlocked with the column series to move therewith.

Each shelf as it is raised and lowered becomes the driving unit of the column when it reaches the path of the gear 34, at which time one or the other of the rows of rack teeth 31 on its brackets 30 according to the particular column in which the shelf happens to be, is engaged by the teeth of said gear 34.

Package ejector mechanism.

Fast on one end of the shaft 51 outside of the drier frame upright F is an arm 62 (see Fig. 1) which is connected by a connecting rod 63 with an arm 64 fast on a rock shaft 65 extending longitudinally of the drier casing between the columns of shelves. Mounted on shaft 65 at either end of the machine and just inside the end frames of the machine is a pair of arms 66. The outer end of each arm 66 carries a pin 67 (see Fig. 5) on which is mounted a double arm lever 68. The upper end of each lever 68 is provided with a pin 69 which extends into a vertical groove in the end frame F of the machine. The lower end of each arm 68 is attached to a package ejector bar 71 which extends lengthwise within the machine for approximately the entire length of the drier shelf (see Figs. 1 and 3).

As the shaft 65 is rocked to turn the arms 66 toward the right, as viewed in Fig. 3, the arms 68 will be given a combined swinging and straight line downward motion, due to the engagement of the pin 69 in the slot 70, causing the pusher 71 to sweep across the drier shelf which has come to rest in alinement with the package discharge belt 350, thus ejecting the packages from said shelf onto said belt.

Main driving mechanism.

Projecting from one of the end uprights F is a frame structure comprising a horizontal frame Y and a vertical frame X. The secondary drive shaft 25 hereinbefore referred to is journaled in a bearing 200 in the frame piece X (see Fig. 11) and a bearing 201 in the adjacent frame F. At its outer end, said shaft 25 is provided with a bevel gear 202 which meshes with a pinion 203 on the main drive shaft 204 of the machine. At its inner end, said shaft 25 is provided with a bevel gear 351 which meshes with the gear 40 on the worm shaft 39 which drives the drier shelf elevating mechanism. The main shaft 204 is rotated from any suitable power source by sprocket 205.

Between its ends, the shaft 25 has a gear 206 fast thereon. The gear meshes with a timer gear 207 loose on a stud 208 journaled in the frames X and F. The stud 208 itself is held rigid in the frames X and F. The gear 207 meshes with a gear 209 loose on the shaft 46 which carries the driving sprocket 25 for the drier shelf transfer mechanism and which shaft is mounted between the frames F and X.

The gear 206 is formed on either side with annular rings 211 which are provided with slots or notches 212 adapted to engage with dogs 213, 214 carried by clutch discs 217, 218 disposed on shaft 25 at either side of the gear 206. The gear 209 is provided with notches, similar to the notches 212 which are adapted to be engaged by dogs 215 and 216 carried by clutch discs 219 and 220 disposed on the shaft 45 at either side of the gear 209. The clutch discs 217, 218, 219, 220, are all loose on their respective shafts.

Disc 217 controls worm shaft 39 which drives the drier shelf elevating mechanism; disc 218 controls cam 21 which operates the loading pusher 9; disc 219 controls shaft 45 which drives the drier shelf transfer mechanism; and disc 220 controls cam 228 which operates the loading shelf 5 and belt pusher 2.

In the machine as shown, the cycle is one in forty-eight, that is to say, the drier shelves make one complete step in their orbit for each forty-eight cans which are placed upon the receiving belt in rows of twenty-four each, and the main driving shaft 204 makes one complete revolution for each can placed on the receiving belt. The gear ratio between the gears 202 and 203 is two to one so that the secondary driving shaft 25 rotates one-half a revolution for each can placed on the receiving belt, or stated differently makes twenty-four complete revolutions for each cycle of the drier shelves. The gears 206 and 209 have each forty-six teeth and the intermediate gear 207 has forty-eight teeth, so that in twenty-four revolutions of the gear 206, the gear 207 will have made twenty-three complete revolutions and will lack two teeth of completing its twenty-fourth revolution.

The clutch dogs are mounted in the clutch discs as detailed in Fig. 12, in which figure the clutch disc 217 is shown as provided with a slot in which the clutch dog 213 fits loosely. Said dog is under spring tension, tending to force the dog outward away from the shaft 25 and this spring tension is provided by a spring plate 221 which is pinned at one end within the clutch disc 217 as indicated at 222, and has its free end disposed beneath the dog 213.

Between its ends the plate 221 is engaged by a spring pin 223 which is held under tension by a spring 224. The spring 224 is seated against a screw plug 225 whereby said plug 225 can be easily removed from the clutch disc in order to replace or vary the tension of the spring. The dogs 214, 215 and 216 are all similarly mounted and held in their respective clutches.

Unless otherwise restrained, the spring tension thus applied to the clutch dogs causes said dogs to be forced outward and their notch-engaging shoulders 213' (see Fig. 12ᶜ) will engage with the notches 212 formed in the rings 211 of the gears 206 and 209 and when thus engaged the clutch disc will be caused to rotate with said gears. In order to reduce friction, the dogs are each preferably provided with anti-friction rolls 213² adapted to travel along the rims of the gears 206 and 209.

Fast on the shaft 208 at either side of the timing gear 207 is a pair of double ended arms 230. The ends of said arms are formed to engage the tails 213² of the dogs which project outwardly beyond the clutch discs in position to be engaged by said arms when the dogs are disengaged or in their inoperative position. The purpose of this construction is to hold the dogs against any further rotation by the reason of friction against the gears 207, 209.

The rim of the timer gear 207 at the right in Fig. 10 is provided with an outer slot 227 into which opens an inner slot 227' of approximately half the length of the slot 227 (see Fig. 12ᵃ).

The opposite or left hand rim of said gear as it appears in Fig. 10 is provided with a pair of diametrically opposite outer slots 229 into which open inner slots 229' each of approximately half the length of an outer slot 229 (see Fig. 12ᵇ).

The slot 227 controls the dog 213 and clutch disc 217 for the drier shelf elevating mechanism 39, 37, 35, etc., and the slot 227' controls the dog 215 and clutch disc 219 for the drier shelf transfer mechanism 45, 43, 41, etc.

The slots 229 control the dog 214 and clutch disc 218 for the loading pusher operating cam 21, and the slots 229' control the dog 216 and clutch disc 220 for the cam 228 which operates both the belt traversing pusher 2 and the loading shelf 5. Inasmuch as the cans are dried in double rows on the drier shelves, the cams 228 and 21 have to operate twice or once every twenty-four cans, whereby to give two actuations to the belt pusher 2, loading shelf 5 and loading pusher 9 to each movement of the drier shelf elevating and transfer mechanisms. I accordingly provide two slots 229 and 229' at diametrically opposite points in the left hand rim of the timer gear 207.

*Timed drive of drier shelf elevating mechanism.*

The slot 227 is made sufficiently long to give the clutch disc 217 a sufficient number of revolutions, eight in this particular case, to rotate the worm shaft 39 and worm wheel on the shaft 37 through a sufficient part of a revolution to raise and lower the shelves one step in their operation. Upon the completion of this rotation, the rim of the gear 207 will throw the dog 213 out of engagement with the gear 206, and said dog will be left in the position shown in Fig. 12 where it will remain until the gear 207 has completed its full number of revolutions to again pick up the dog and raise the drier shelves their next step.

*Timed drive of drier shelf transfer mechanism.*

After the timing gear 207 has thrown out the dog 213 on the completion of the shelf raising operation, the continued rotation of the gear 207 will bring the slot 227' in said gear and the notch 212 in the gear 209 into proper relation with the dog 215 in the clutch disc 219 so that the dog 215 will be engaged and dog and clutch 219 will be rotated together. Such rotation will carry the sprocket 45 through four revolutions and through the chain 43 will rotate the sprocket 42 one revolution thereby operating the drier shelf transfer mechanism once. On the completion of the fourth revolution of sprocket 45, the surface of the rim of gear 209 will contact with the dog 215 to disengage it from the notch 212 in the gear 209 and leave the clutch disc 219 at rest during the remainder of the cycle of operation of the machine.

*Timed drive of belt pusher and loading shelf operating mechanism.*

The further rotation of the timer gear 207 will bring one of the notches 229 into alinement with the dog 216 at the same time that the notch 212 in gear 209 also comes into alinement with said dog, whereupon the dog will engage in said notch and rotate clutch disc 220, and cam 228 which is fast on said disc, one revolution. The cam path 228² of said cam through arm 300, shaft 301, lever 302, and connecting rod 303 operates the loading shelf 5 and the cam path 228' on the opposite side of said cam, through arm 305, shaft 306, arm 307 and connecting rod 308 operates the belt pusher 2. At the completion of its rotation, the cam 228 returns to original position and the plain surface of the rim of the gear 207 will force the dog 216 inward and disengage it from the notch in the gear 209 at which time the cam will come to rest.

Inasmuch as the belt pusher 2 and loading shelf 5 operate twice to each operation of the drier shelf elevating and transfer mechanisms, (where the cans are loaded in double rows) the cam 228 is rotated through a second revolution when the opposite notch of the pair of notches 229' of the timer gear 207 is brought into alinement with the dog 216 and engaged with gear 209 as just explained, thereby actuating the belt pusher and loading shelf a second time.

*Timed drive of loading pusher operating mechanism.*

The further rotation of timer gear 207 will bring one of the slots 229 into alinement with the dog 214 at the same time that the notch 212 in the gear 206 also comes into alinement with the dog, whereupon the dog will be engaged in said notch and cause the clutch disc 219 together with the gear 24 fast thereon, to rotate and thereby through its engagement with the teeth 23 of the cam 21 will rotate said cam one half revolution and thereby actuate the loading pusher 9 once. At the end of this rotation, the surface of the rim of the gear 207 will engage with the clutch dog 214 to throw it out of engagement with the gear. The dog 214 is picked up again when the opposite slot of the pair of slots 229 of timer gear 207 is brought into alinement with said dog whereby to rotate gear 24 through another revolution, and thereby again actuate the loading pusher 9 which thus operates twice to every operation of the drier shelf elevating and transferring mechanisms (where the cans are loaded in double rows).

*Drive for receiving and delivery belts.*

The receiving belt 1 is driven from the main driving shaft 204 by a crank disc 310 fast on said shaft and connected by a rod 311 which is pivotally connected at 312 with an arm 313 fast on a shaft 314 which is pivotally connected at 312 journaled in the end frame F (see Fig. 9). On the opposite end of said shaft 314 is an arm which is forked at its upper end and has journaled between its forks a roll 316 and an eccentric 317 between which the belt 1 passes. The eccentric 317 is held against falling by coil spring 318 so that when the arm 315 is rocked to the left in Fig. 9, the belt will be gripped and fed a definite linear distance.

The delivery belt 350 is driven from the main drive shaft by a sprocket 319 thereon and a chain 320 from said sprocket to a sprocket 321 on the belt shaft at the right of the machine in Fig. 1.

*Operation.*

With the proper number of cans placed in a row A on the receiving belt, the loading shelf 5 rises to the level of said belt, as indicated in Fig. 17, and the belt pusher 2 moves the can row A onto said shelf, whereupon the loading shelf lowers, as indicated in Fig. 18, to the level of that shelf S in the train of drier shelves which has come to a pause in alinement with the lowered position of the loading shelf, and the loading pusher 9 operates on its long throw to move the can row A to the farther edge of the loading shelf, as indicated in Fig. 19.

In the meantime, a second row of cans B has been placed on the belt 1 (Fig. 19). When the loading shelf again rises, the belt pusher 2 moves said can row B onto said shelf whereupon the shelf lowers, as indicated in Fig. 20, and the loading pusher 9 operates on its short throw to move the can row B onto the drier shelf S adjacent the nearer edge thereof, as indicated in Fig. 21, said drier shelf remaining in the position of Figs. 17 to 21 inclusive until both rows A and B are loaded thereon, and then rising to bring the shelf immediately therebeneath and which has just been unloaded by the ejector 71, into loading position to receive the subsequent can rows, one of which is indicated at C, Figs. 20 and 21.

After completing the orbit of the drier shelf flight, the can rows A and B on the loaded shelf S are automatically and successively removed by the ejector 71 as said shelf pauses in alinement with the delivery belt 350.

While I have shown and described my machine as set to handle a specific number of cans, it will be understood that such illustration is solely for the purposes of disclosure.

Various modifications in the construction and operation of my invention may obviously be resorted to all without departing from the spirit of my invention if within the limits of the appended claims.

What I therefore claim and desire to secure by Letters Patent is:

1. In a drier, a package feeder and an ascending and a descending column of spaced superposed interlockingly connected drier units, successively movable intermittently past said feeder, a loading member disposed between said feeder and drier units, and means for transferring packages from said feeder to said loading member and from said loading member to each drier unit in the ascending column of drier units as said column pauses adjacent the feeder.

2. In a drier, a package feeder, a plurality of spaced drier units successively movable intermittently therepast, a loading member disposed between said feeder and drier units, and means for transferring packages from said feeder to said loading member and from said loading member to each drier unit as said units pause adjacent the loading member.

3. In a drier, a package feeder, a plurality of spaced drier units successively movable intermittently therepast, a loading member disposed between said feeder and drier units, means for moving said loading member into alinement with said feeder, means for transferring packages from said feeder to said loading member when so alined, and means for transferring the packages from said loading member to said drier units as said units pause adjacent the loading member.

4. In a drier, a package feeder, a plurality of spaced drier units successively movable intermittently past said feeder, a loading member disposed between said feeder and drier units, means for moving said loading member into alinement with said feeder and for subsequently moving said member into alinement with each drier unit as said units pause adjacent the loading member, and means for transferring packages from said feeder to said loading member and from said loading member to the drier units.

5. In a drier, a package feeder, an ascending and a descending column of spaced superposed interlockingly connected drier units successively movable intermittently past said feeder, a loading member disposed between said feeder and drier units and means for transferring packages from said feeder to said loading member and from said loading member to said drier as it pauses adjacent the feeder.

6. In a drier, a package feeder, a plurality of spaced superposed drier units successively movable intermittently in an orbital path past said feeder, a loading member disposed between said feeder and drier units, and means for transferring packages from said feeder to said loading member and from said loading member to each drier unit as said units pause adjacent the loading member.

7. In a drier for simultaneously drying a double row of articles, an article support, a drier movable relative to said support, a loading member movable between said drier and support, a transferror operating to move a row of articles from said support to said loading member, a transferror operative to move said row of articles from said loading member to said drier, and means for operating said transferrors and loading member twice to each movement of the drier member.

8. In a drier, a package feeder, an ascending and a descending column of spaced superposed interlockingly connected drier units successively movable intermittently past said feeder, a loading member disposed between said feeder and drier units, and means for transferring packages from said feeder to said loading member and from said loading member to each drier unit as said units pause adjacent the loading member.

9. In a drier, a package feeder and a drier member, a loading member disposed between said parts, and means for successively transferring packages from said feeder to said loading member and from said loading member to said drier member.

10. In a drier, a package feeder and a drier member, a loading member movable between said parts, and automatic means for successively transferring packages from said feeder to said loading member and from said loading member to said drier member.

11. In a drier, a package feeder, a drier member opposite thereto, a loading member movable vertically between said feeder and drier, and means for transferring packages from said feeder initially to said loading member and subsequently to said drier member at successive positions of said loading member relative to said feeder and drier member.

12. In a drier, a package feeder and a drier member disposed when in loading position in different planes relative to each other, a loading member operable between said feeder and drier and means for initially moving packages from said feeder to said loading member when said loading member is alined with said feeder and for subsequently moving the packages from said loading member to said drier member when said loading member is alined with said drier member.

13. In a drier, a package feeder and a drier member disposed when in loading position in different horizontal planes relative to each other, a loading member operable vertically between said feeder and drier to transfer packages from one to the other, means operating when the loading member is alined with the feeder to transfer packages from said feeder to said loading member, and means operative when the loading member is alined with the drier member to transfer the packages from said loading member to said drier member.

14. In a drier, a package feeder and a drier member disposed when in loading position in different planes relative to each other, a loading member operable between said feeder and drier to transfer packages from one to the other, a pivotally mounted transferror operating when the loading member is alined with the feeder to move packages from said feeder to said loading member, and a slidingly mounted transferror operating when the loading member is alined with the drier member to move the packages from said loading member to said drier member.

15. In a drier, a package feeder and a drier member, a loading member disposed between said parts, and means for transferring the packages from said feeder to said loading member, and from said loading member to said drier member, a package discharge member, and means for transferring the dried packages from said drier member to said discharge member.

16. In a drier, a package feeder and a drier member movable relative to each other and disposed when in loading position in different planes, a package discharge member, a loading member operable between the planes of said feeder and drier to transfer packages from one to the other, a transferror operating when the loading member is alined with the feeder to move packages from said feeder to said loading member, a transferror operating when the loading member is alined with the drier member to move the packages from said loading member to said drier member and a package ejector operating when the drier member is alined with said package discharge member to move the dried packages onto said discharge member.

17. In a drier for simultaneously drying a double row of individual packages, a package feeder, a drier member movable relative to said feeder, means for successively placing a double row of packages onto said drier member, one row at a time, said rows being disposed adjacent the outer and inner edges respectively of the drier member.

18. In a drier for simultaneously drying a double row of packages, a package feeder, and a drier member movable relative thereto, and a package transferror having a long movement and a short movement upon successive actuations thereof to place the packages from said feeder onto said drier member in double rows disposed adjacent the inner and outer edges of the drier member.

19. In a drier for simultaneously drying a double row of packages, a package feeder, and a drier member movable relative thereto, a package transferror having a long movement and a short movement upon successive actuations thereof to place the packages from said feeder onto said drier member in double rows disposed adjacent the inner and outer edges of the drier member, and a cam operatively connected with said transferror and having a cam path formed to impart a long and a short movement to said transferror successively during each revolution of the cam.

20. In a drier for simultaneously drying a double row of packages, a package feeder, a drier member movable relative thereto and disposed when in loading position in a different plane from that of the package feeder, a loading member movable between the planes of said members, a transferror operating when the loading member is alined with the feeder to move a row of packages from said feeder to said loading member, a transferror operating when the loading member is alined with said drier member to move said row of packages from said loading member to said drier member, and means for operating said transferrors and loading member twice to each movement of the drier member including mechanism for imparting to said second-named transferror successive long and short movements thereof whereby to place the first row of packages adjacent the inner edge of the drier member and the second row of packages adjacent the outer edge of said drier member.

21. In a drier for simultaneously drying a double row of packages, a package feeder, a drier member movable relative thereto and disposed when in loading position in a different plane from that of the package feeder, a loading member movable between the planes of said members, a transferror operating when the loading member is alined with the feeder to move a row of packages from said feeder to said operating member operating when the loading member is alined with said drier member to move said row of packages from said loading member to said drier member, and means for operating said transferrors and loading member twice to each movement of the drier member, including a cam having a cam path formed to impart to said second-named transferror at every revolution of the cam successive long and short movements thereof whereby to place the first row of packages adjacent the inner edge of the drier member and the second row of packages adjacent the outer edge of said drier member.

22. In a drier for simultaneously drying a double row of packages, a package feeder, a drier member movable relative thereto and disposed when in loading position in a different plane from that of the package feeder, a loading member movable between the planes of said members, a transferror for moving a row of packages from said feeder to said loading member, a transferror for moving said row of packages from said loading member to said drier member, and means for operating said loading member and transferror twice to each movement of the drier member whereby to place two rows of packages successively upon the drier member.

23. In a drier, an ascending and descending column of drier units, a package feeder mounted adjacent one column of drier units, a loading member operating between said column and said package feeder, means for transferring packages from said package feeder to said loading member when said loading member is alined with said package feeder and for transferring said packages from said loading member to a drier unit of the adjacent column of units when said loading member has moved into alinement with said drier unit, a package discharge conveyer operating adjacent the package feeder, and a package ejector disposed between the columns of drier units and effective to remove the dried packages from each drier unit as said unit successively comes into alinement with said package discharge conveyer.

24. In a drier, an ascending and descending column of interlockingly connected drier units, a horizontally disposed package feeder mounted adjacent one column of drier units, a loading member disposed between said column and said package feeder and operating vertically relative thereto, means for transferring packages from said package feeder to said loading member when said loading member is alined with said package feeder and for transferring said packages from said loading member to a drier unit of the adjacent column of units when said loading member has moved into alinement with said drier unit, a package discharge conveyer operating in a plane parallel to the package feeder, a package ejector disposed between the columns of drier units and effective to remove the dried packages from each drier unit as said unit successively comes into alinement with said package discharge conveyer, means for intermittently moving the drier unit columns relative to the package feeder, and means for transferring the uppermost unit of the ascending column and the lowermost unit of the descending column into position in line with their respective opposite columns.

25. In a drier, an ascending column of interlockingly connected drier units, each comprising a shelf and depending brackets having rack teeth, a horizontally disposed package feeder extending longitudinally adjacent one column of drier units, a loading member disposed between said column and said package feeder and operating vertically relative thereto, means for transferring packages from said package feeder to said loading member when said loading member is alined with said package feeder and for transferring said packages from said loading member to a drier unit of the adjacent column of units when said loading member has moved into alinement with said drier unit, a package discharge conveyer operating in a plane parallel to the package feeder, a package ejector disposed between the colums of drier units and effective to remove the dried packages from each drier unit as said unit successively comes into alinement with said package discharge conveyer, a gear meshing with the rack teeth of the shelf brackets for moving said shelves relative to the package feeder, means for rotating said gear intermittently, and slides at the tops and bottoms of said drier unit columns for automatically engaging and transferring the uppermost shelf of the ascending column and the lowermost shelf of the descending column into position in line with their respective columns.

26. In a package drier, a drier casing, an ascending and descending column of spaced superposed interlockingly connected drier units upon which the packages to be dried are adapted to be loaded, rack teeth on said units and means engaging said rack teeth for moving said units intermittently within said casing.

27. In a package drier, a drier casing, an ascending and descending column of spaced superposed drier units, upon which the packages to be dried are adapted to be loaded, opposite rows of teeth on each drier unit, and a gear engaging one or the other of said rows of teeth for moving said units intermittently within said casing.

28. In a package drier, a drier casing, an ascending and a descending column of spaced superposed interlockingly connected drier units upon which the packages to be dried are adapted to be loaded, means for moving said units intermittently within said casing, and means for transferring the uppermost unit of the ascending column and the lowermost unit of the descending column to new positions in line with their respective opposite columns of units.

29. In a package drier, a drier casing, an ascending and a descending column of interlockingly connected spaced superposed drier units upon which the packages to be dried are adapted to be loaded, means for moving said units intermittently within said casing, and means for transferring the uppermost unit in the ascending column, and the lowermost unit in the descending column into position below the lowermost unit of the ascending column for interlocking connection with said respective columns at a succeeding step in the travel of the columns.

30. In a package drier, a drier casing, an ascending and a descending column of interlockingly connected spaced superposed drier units upon which the packages to be dried are adapted to be loaded, means for moving said units intermittently within said casing, and a pair of oppositely traveling slides for transferring the uppermost unit in the ascending column into position above the uppermost unit in the descending column, and the lowermost unit in the descending column into position below the lowermost unit of the ascending column for interlocking connection with said respective columns at a succeeding step in the travel of the columns.

31. In a package drier, a drier casing, an ascending and a descending column of interlockingly connected spaced superposed drier units upon which the packages to be dried are adapted to be loaded, means for moving said units intermittently within said casing, slides at opposite ends of the drier columns for transferring the uppermost unit in the ascending column into position above the uppermost unit in the descending column, and the lowermost unit in the descending column into position below the lowermost unit of the ascending column for interlocking connection with said respective columns, means for intermittently actuating the slide at one end of the drier columns, and motion transmitting connections from said slide to the slide at the opposite end of the drier columns for operating said last-named slide in opposite direction to said first-named slide.

32. In a drier, a package feeder, and an ascending and descending column of interlockingly connected drier units movable intermittently past said feeder, each drier unit consisting of a shelf having brackets at its ends and each bracket having both longitudinal edges formed as rack teeth, and having a central guiding slot between said rows of rack teeth, a driven shaft disposed between said column of dry units and having a gear meshing with the adjacent rows of rack teeth of each column of shelves, and vertically disposed guides arranged for engagement with said slots of the shelf brackets.

33. In a drier, a drier casing, a package feeder operating adjacent said casing, an ascending and a descending column of drier shelves arranged for intermittent travel in said casing, brackets at the ends of said shelves each having a series of rack teeth, gears mounted for engagement with said rack teeth of said columns and means for interlockingly connecting the shelf units in each column in spaced superposed relation.

34. In a drier, a drier casing, a package feeder operating adjacent said casing, an ascending and a descending column of drier shelves arranged for intermittent travel in said casing, brackets at the ends of said shelves each having a series of rack teeth on each longitudinal edge, mounted between said columns of shelves for engagement with one or the other series of rack teeth according to the direction of travel of the shelves, and means for interlocking the connecting shelf units in each column in spaced superposed relation comprising a tongue at one end and a groove at the opposite end of each bracket adapted for engagement with the tongue and groove of the shelf bracket next above or below.

35. A drier, a drier casing, a package feeder disposed adjacent said casing, an ascending and a descending column of interlockingly connected drier units movable intermittently through said casing, means for successively transferring the uppermost unit of the ascending column and the lowermost unit of the descending column into position in line with their respective opposite columns, comprising a sprocket shaft, a sprocket thereon, an arm having a slideway, a stud on said sprocket working in said slideway, a drier unit actuating slide operating transversely across the upper end of the drier casing between said columns of drier units and operatively connected with the slideway of said arm, a drier unit actuating slide operating across the bottom of the casing between the columns of drier units and a driving connection operated by the upper slide and engaging the lower slide to drive said lower slide in opposite direction to said upper slide.

36. A drier, a drier casing, a package feeder disposed adjacent said casing, an ascending and a descending column of drier units movable intermittently within said casing, each drier unit consisting of a shelf having brackets at its ends and each bracket having a row of rack teeth along each longitudinal edge, a drive shaft extending between said columns of drier units and having a gear thereon adapted to mesh with one or the other rows of rack teeth of said shelves, and means for successively transferring the uppermost unit of the ascending column and the lowermost unit of the descending column into position in line with their respective opposite columns, comprising a sprocket shaft, a sprocket thereon, an arm having a slideway, a stud on said sprocket working in said slideway, a drier unit actuating slide operating transversely across the upper end of the drier casing between said columns of drier units and operatively connected with the slideway of said arm, a drier unit actuating slide operating across the bottom of the casing between the columns of drier units at the bottom of said casing, and a drive chain operated by the upper slide and engaging the lower slide to drive said lower slide in opposite direction to said upper slide.

37. A drier, a drier casing, a package feeder adjacent to said casing, an ascending and a descending column of drier units movable intermittently within said casing, means for successively transferring the uppermost unit of the ascending column and the lowermost unit of the descending column into position in line with their respective opposite columns, comprising a sprocket shaft, a sprocket thereon, a rock shaft, a rocker arm at one end of said rock shaft having a slideway, a stud on said sprocket working in said slideway, a rocker arm at the opposite end of said sprocket shaft and having a stud, an arm at the opposite end of said rock shaft having a slideway within which said last-named stud works, a pair of drier unit actuating slides operating transversely across the upper end of the drier casing and operatively connected with said rocker arms, a pair of drier unit actuating slides operating across the bottom of the casing, a driving connection between said upper and lower pairs of slides for driving said lower pair in opposite direction to said upper pair, a package ejector disposed between the columns of drier units, and operative connections from said rock shaft to said ejector.

38. In a package drier, a drier casing, an ascending and a descending column of drier units movable intermittently within said casing and upon which the packages to be dried are loaded, transfer mechanism for successively transferring the uppermost unit of the ascending column and the lowermost unit of the descending column into position in line with their respective opposite columns, a driving mechanism for said transfer mechanism, and a package ejector operating from said driving mechanism.

39. In a package drier, a drier casing, an ascending and a descending column of drier units movable intermittently within said casing and upon which the packages to be dried are loaded, transfer mechanism for successively transferring the uppermost unit of the ascending column and the lowermost unit of the descending column into position in line with their respective opposite columns, a driving mechanism for said transfer mechanism, a rock shaft disposed between the columns of drier units and operatively connected with the drier unit operating mechanism, a rocker arm at each end of said rock shaft, a double arm lever operatively connected with each rocker arm, guides for the upper ends of said levers, and an ejector mounted on the lower ends of said levers.

40. In a drier, a drier casing, a package feeder, an ascending and a descending column of drier units movable intermittently within said casing, means for successively transferring the units from one column to the other, an ejector operated from said drier unit transfer mechanism, and means for imparting a combined straight line and pivotal motion to said ejector.

41. In a drier, a package feeder, a drier member operating therepast, a loading member operating between said drier member and said package feeder, a transferror for moving packages from said package feeder to said said loading member, a transferror for moving packages from said loading member, to said drier member, a driving shaft, operative connections therefrom to said drier member, a cam driven from said driving shaft and operating said loading member and one of said package transferrors, a cam driven from said driving shaft and operating the other package transferror, and a clutch mechanism associated with said driving shaft for operating said parts in properly timed relation to each other.

42. In a drier, a package feeder, an ascending and a descending column of drier shelves, a drive shaft for moving said shelves intermittently past said package feeder, shelf-transfer mechanism for successively transferring the shelves at the ends of each column into position in line with the shelves in the opposite column, a drive shaft for said shelf-transfer mechanism, a loading member operating between said shelves and the package feeder, a transferror for moving packages from said feeder to said loading member, a transferror for moving packages from said loading member to said drier shelves, a main driving shaft, operative connections therefrom to said shelf-driving and transferring mechanisms, cams driven from said main driving shaft for operating said loading member and said package transferrors, and a clutch mechanism associated with said main driving shaft for operating said shelf-driving and transferring mechanisms, loading member and package transferrors in properly timed relation.

43. In a drier, an ascending and a descending series of interlockingly connected drier units, mechanism for elevating said units, mechansm for transferring the units at the extremities of each column from one column into position in line with the other column, a package feeder adjacent the drier units, a loading member operating between said drier units and said package feeder, a first package transferror for moving the packages from said feeder to said loading member, a second package transferror for moving the packages from said loading member to said drier units, a drive shaft operatively connected with said drier unit elevating mechanism, a cam driven from said drive shaft for operating said second package transferror, a timer mechanism between said shaft and drier unit transfer mechanism, a cam included in said drier unit transfer mechanism and operatively connected with said first package transferror and said loading member, and a clutch mechanism controlled by said timer mechanism for operating the drier unit elevating and transfer mechanism and the cams controlling the package transferrors and the loading member in properly timed relation to each other.

44. In a drier, an ascending and a descending series of interlockingly connected drier units, a shaft and operative connections for elevating said units, a shaft and operative connections for transferring the units at the extremities of each column from one column into position in line with the other column, a package feeder adjacent the drier units, a loading member operating vertically between said drier units and said package feeder, a first package transferror for moving the packages from said feeder to said loading member, a second package transferror for moving the packages from said loading member to said drier units, a drive shaft operatively connected with said shaft for operating the drier unit elevating mechanism, a cam driven from said drive shaft for operating said second package transferror, a timer mechanism between said drive shaft and said shaft for operating the drier unit transfer mechanism, a cam on said drive shaft for the drier unit transfer mechanism operatively connected with said first package transferror and said loading member, and a clutch mechanism controlled by said timer mechanism for operating the drier unit elevating and transfer mechanisms and the cams controlling the package transferrors and the loading member in properly timed relation to each other.

45. In a drier, a drive shaft, a timer and a drier shelf transfer shaft geared to each other, a drier shelf elevating shaft driven from said drive shaft, a cam driven from said drier shelf transfer shaft, and a cam driven from said drive shaft, a package transferror and a loading member driven from said first named cam and a package transferror driven from said second named cam, and a clutch mechanism associated with said timer shaft for driving said drier shelf elevating and transfer shafts and said cams in properly timed relation to each other.

46. In combination, two oppositely disposed columns of shelf units, the units of each column being interlockingly connected with each other to form a solid train, means for simultaneously imparting to said columns intermittent rectilinear motion to cause said columns to slide in opposite directions and means for successively transferring the uppermost unit of one column and the lowermost unit of the other column to new positions in line with the respective opposite columns of units.

47. In combination, two opposite columns of shelf units, the units of each column being interlockingly connected with each other to form a solid train, means for simultaneously imparting to said columns intermittent rectilinear motion to cause said columns to slide in opposite directions, and means for imparting to the uppermost unit of one column and the lowermost unit of the other column rectilinear motion in paths at right angles to the paths of columnar travel whereby to successively transfer said units from one column to the other.

48. In combination, an ascending and a descending shelf column arranged in spaced oppositely disposed relation to each other, each column comprising a superposed series of spaced units interlockingly connected to each other to form a solid, unbroken train, means for simultaneously imparting intermittent rectilinear motion to said columns to cause them to slide as units in parallel paths and in opposite directions, and means for imparting to each uppermost unit in the ascending column and to each lowermost unit in the descending column rectilinear motion in parallel paths at right angles to the paths of columnar movement whereby to successively transfer said units from one column to the other.

49. In combination, an ascending and a descending column of shelf units, said columns distinct and independent of each other and each comprising a superposed series of spaced units interlockingly connected with each other to form a solid, unbroken train, means for simultaneously imparting to said columns as units intermittent rectilinear motion to cause them to slide in parallel paths and in opposite directions, and means for imparting to each uppermost unit in one column and each lowermost unit in the opposite column rectilinear motion in parallel paths at right angles to the paths of columnar motion whereby to successively transfer said units from one column to the other.

50. In combination, a superposed series of spaced shelf units, each unit formed at its ends for interlocking connection with the similarly formed ends of the units next above and below whereby to provide a solidly locked unbroken train, and each unit between its ends provided with an engageable element alined with the similarly formed engageable elements of the units next above and below to provide a continuous surface of engagement for an actuator, and an intermittently effective actuator disposed for successive engagement with the engageable elements of the shelf units to impart rectilinear motion to said column.

51. In combination, a superposed series of spaced shelf units, each unit tongued and grooved at its ends for interlocking connection with the similarly formed ends of the units next above and below whereby to provide a solidly locked unbroken train, and each unit between its ends provided with an engageable element alined with the similar engageable element of the units next above and below to provide a continuous surface of engagement for an actuator, and an intermittently effective actuator disposed for successive engagement with the engageable elements of the shelf units to impart rectilinear motion to said column.

In testimony whereof I affix my signature.

GEORGE A. ROBINSON.